(12) United States Patent
Han et al.

(10) Patent No.: US 11,733,343 B2
(45) Date of Patent: Aug. 22, 2023

(54) METHOD AND SERVER FOR ASSOCIATING ADDRESS WITH FINGERPRINT

(71) Applicant: KOREA ADVANCED INSTITUTE OF SCIENCE AND TECHNOLOGY, Daejeon (KR)

(72) Inventors: Dongsoo Han, Daejeon (KR); Sungeun Lee, Seoul (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 16/966,621

(22) PCT Filed: Jan. 8, 2019

(86) PCT No.: PCT/KR2019/000232
§ 371 (c)(1),
(2) Date: Jul. 31, 2020

(87) PCT Pub. No.: WO2019/151665
PCT Pub. Date: Aug. 8, 2019

(65) Prior Publication Data
US 2021/0025966 A1    Jan. 28, 2021

(30) Foreign Application Priority Data
Feb. 1, 2018  (KR) .................. 10-2018-0012828

(51) Int. Cl.
*G01S 5/02* (2010.01)
*H04W 84/12* (2009.01)

(52) U.S. Cl.
CPC ...... *G01S 5/02526* (2020.05); *G01S 5/02527* (2020.05); *H04W 84/12* (2013.01)

(58) Field of Classification Search
CPC ............ G01S 5/02521; G01S 5/02522; G01S 5/02523; G01S 5/02524; G01S 5/02525; G01S 5/02527
USPC .......................................................... 342/451
See application file for complete search history.

(56) References Cited

U.S. PATENT DOCUMENTS

| | | | |
|---|---|---|---|
| 8,385,943 B1 * | 2/2013 | Han | H04W 4/33 455/456.1 |
| 9,942,717 B1 * | 4/2018 | Chen | H04W 64/00 |
| 2013/0044760 A1 * | 2/2013 | Harjanto | H04L 61/103 370/401 |
| 2021/0263130 A1 * | 8/2021 | Viitala | G01S 5/0252 |

FOREIGN PATENT DOCUMENTS

| | | |
|---|---|---|
| KR | 1020130047386 A | 5/2013 |
| KR | 1020170071751 A | 6/2017 |
| KR | 1020170078120 A | 7/2017 |
| KR | 101773982 B1 | 9/2017 |
| KR | 1020170139776 A | 12/2017 |

* cited by examiner

*Primary Examiner* — Harry K Liu
(74) *Attorney, Agent, or Firm* — Rabin & Berdo, P.C.

(57) ABSTRACT

A method for associating an address with a fingerprint, according to an aspect of the present invention, comprises the steps of: receiving collected information including an address and a wireless LAN fingerprint; storing the received collected information; filtering multiple pieces of stored collected information according to addresses, on the basis of multiple pieces of collected information for adjacent addresses; and constructing a radio map by using the collected information filtered according to addresses.

16 Claims, 5 Drawing Sheets

①​$\begin{cases} \text{for all } (A_i, F_{j,i}) \text{ in } S \\ \quad \text{Score}(A_i, F_{j,i}) = 0 \; ; \; // \text{ Set 0 as initial connectivity score} \\ \text{end for} \end{cases}$ for all $S_k$ in $S$ ~② for all $F_{p,k}$ in $S_k$ ~③ ④ for all $F_q$ in $N\_A_k$ // $F_q$ is a fingerprint existing in $N\_A_k$ ⑤​$\begin{cases} \text{if } F_{p,k} \text{ and } F_q \text{ have one or more access points in common then} \\ \quad \text{Score}(A_k, F_{p,k}) = \text{Score}(A_k, F_{p,k}) + 1 \; ; \\ \text{else} \\ \quad \text{Score}(A_k, F_{p,k}) = \text{Score}(A_k, F_{p,k}) - 1 \; ; \end{cases}$ end for

FIG. 5

METHOD AND SERVER FOR ASSOCIATING ADDRESS WITH FINGERPRINT

TECHNICAL FIELD

The present invention relates to a method and server for associating an address with a fingerprint and, more particularly, to a method and server for associating an address with a fingerprint, which collects fingerprints and addresses from a large number of unspecified people at the same time and labels the fingerprints with the addresses according to connection characteristics of the collected fingerprints and addresses.

BACKGROUND ART

Association information between an address and a wireless LAN fingerprint is important to recognize an indoor location using wireless LAN signals in large areas such as cities and countries. This is because the association information between the address and the wireless LAN fingerprint is essential information used for constructing a radio map in a city or country, which is based on a highly accurate indoor location recognition system for a large area. When the indoor location is estimated on the basis of the database containing wireless LAN fingerprints and location information associated with the same, it is possible to estimate indoor location with much higher accuracy compared to base station-based location recognition or GPS-based location recognition techniques.

Various techniques have been proposed to construct a database for associating an address with a wireless LAN fingerprint. As the existing proposed technique, assuming that address information is given in advance, a technique to associate a given address with a wireless LAN fingerprint collected at the address through a smartphone or fixed device has been mainly used. As a result, a unit collecting the signal and a unit obtaining the address information are separated from each other, whereby there is a problem that the proposed scheme was not smoothly realized.

Therefore, when the address information is collected along with fingerprints, it is possible to construct an address-based radio map more quickly, without the problem of separation between the unit collecting wireless LAN signals and the unit obtaining the address information.

Meanwhile, there are various considerations when simultaneously collecting addresses and fingerprints. For example, there is a need to determine whether the address associated with the collected fingerprint is an address corresponding to the location where the fingerprint is collected. When collecting an address other than the address corresponding to the location where the fingerprint is actually collected, a method of filtering the address is needed.

As described above, there is a need for a method and server for associating an address with a fingerprint, which is capable of overcoming the limitations of the existing address and fingerprint association method.

DISCLOSURE

Technical Problem

The present invention has been made to solve the above-mentioned problems, and an objective of the present invention is to provide a method and server for associating an address with a fingerprint, in which fingerprints and addresses are collected at the same time using a device capable of being used by a large number of unspecified people to construct a radio map through the same.

In addition, an objective of the present invention is to provide a method and server for associating an address with a fingerprint, in which multiple addresses and associated fingerprints simultaneously collected from arbitrary devices are utilized to filter the collected fingerprints and addresses and construct a highly reliable radio map on the basis of the filtered fingerprints and addresses.

In addition, an objective of the present invention is to provide a method and server for associating an address with a fingerprint, in which fraudulent transactions are detected through recognition of the collection locations of fingerprints in product transaction or payment.

The technical problems to be achieved in the present invention are not limited to the technical problems mentioned above, and other technical problems that are not mentioned will be clearly understood by those of ordinary skill in the art from the following description.

Technical Solution

A method of associating an address with a fingerprint according to an aspect of the present invention may include receiving collected information including an address input from a user for delivery and a wireless LAN fingerprint collected when the address is input; storing the address and the wireless LAN fingerprint of the received collected information while associating the address and the fingerprint with each other; filtering multiple pieces of stored collected information; and constructing a radio map by using the filtered collected information.

In the method of associating the address with the fingerprint, the address of the collected information may be determined by input of the user terminal, and the wireless LAN fingerprint may include one or more wireless LAN identifier and wireless LAN signal strength pairs collected when the address is input.

In the method of associating the address with the fingerprint, the collected information may be received from an online shopping app or a delivery app installed in the user terminal; and the online shopping app or the delivery app may collect the one or more wireless LAN identifier and wireless LAN signal strength pairs before, after, or before and after the address input is received from the user.

In the method of associating the address with the fingerprint, the filtering may include calculating the connectivity index for wireless LAN fingerprints and the corresponding addresses of multiple pieces of collected information for each address by using wireless LAN fingerprints of multiple pieces of collected information in an adjacent address.

In the method of associating the address with the fingerprint, the filtering may include calculating the connectivity index for wireless LAN fingerprints and the corresponding addresses of multiple pieces of collected information for each address by using wireless LAN fingerprints of different collected information in the same address.

In the method of associating the address with the fingerprint, the constructing of the radio map may include labeling a wireless LAN fingerprint having the highest connectivity index for each address with the address, and storing a labeling result as the radio map.

In the method of associating the address with the fingerprint, the filtering includes comparing wireless LAN identifiers of each wireless LAN fingerprint for each address and each wireless LAN fingerprint of multiple pieces of collected information in an adjacent address to calculate the connectivity index, and increasing the connectivity index when there is a common wireless LAN fingerprint and decreasing the connectivity index when there is no common wireless LAN fingerprint.

The method of associating the address with the fingerprint may further include, after the constructing of the radio map, receiving a request for processing including the wireless LAN fingerprint; estimating a location associated with the wireless LAN fingerprint using the radio map; and authenticating the request for processing according to the estimated location.

In the method of associating the address with the fingerprint, the filtering may include calculating the connectivity index of the wireless fingerprint by further using collection time information included in the collected information for each address.

A server for associating an address with a fingerprint according to an aspect of the present invention includes a communication unit receiving collected information including an address input from a user for delivery and a wireless LAN fingerprint collected when the address is input; a storage unit storing the address and the wireless LAN fingerprint of the received collected information while associating the address and the fingerprint with each other; and a control unit filtering multiple pieces of the stored collected information and constructing a radio map by using the filtered collected information.

In the server for associating the address with the fingerprint, the address of the collected information may be determined by input of the user terminal, and the wireless LAN fingerprint may include one or more wireless LAN identifier and wireless LAN signal strength pairs collected when the address is input.

In the server for associating the address with the fingerprint, the control unit may calculate the connectivity index for wireless LAN fingerprints and the corresponding addresses of multiple pieces of collected information for each address by using wireless LAN fingerprints of multiple pieces of collected information in an adjacent address and wireless LAN fingerprints of different collected information in the same address, in order to filter the multiple pieces of collected information.

In the server for associating the address with the fingerprint, the control unit may label a wireless LAN fingerprint having the highest connectivity index for each address with the address, and store a labeling result as the radio map, in order to construct a radio map.

In the server for associating the address with the fingerprint, the control unit compares wireless LAN identifiers of each wireless LAN fingerprint for each address, and each wireless LAN fingerprint of multiple pieces of collected information in an adjacent address or each wireless LAN fingerprint of different collected information in the same address to calculate the connectivity index, and increases the connectivity index when there is a common wireless LAN fingerprint and decreases the connectivity index when there is no common wireless LAN fingerprint.

In the server for associating the address with the fingerprint, after the constructing of the radio map, the control unit may receive a request for processing including the wireless LAN fingerprint; estimate a location associated with the wireless LAN fingerprint using the constructed radio map; and authenticate the request for processing according to the estimated location.

A method of associating an address with a fingerprint according to an aspect of the present invention may include receiving an address input from a user and a wireless LAN fingerprint collected when the address is input, filtering the collected information including the received address and wireless LAN fingerprint, and constructing a radio map using filtered collected information, in order to perform delivery using an app installed in the user terminal.

In the method of associating the address with the fingerprint, the app may be an online shopping app or deliver app.

In the method of associating the address with the fingerprint, the filtering may be performed on the basis of the similarity obtained by comparing the wireless LAN fingerprint of the collected information for each address and the wireless LAN fingerprints of the adjacent address.

Advantageous Effects

The method and server for associating an address with a fingerprint according to the present invention has an effect that fingerprints and addresses can be collected at the same time using a device capable of being used by a large number of unspecified people to construct a radio map through the same In addition, the method and server for associating an address with a fingerprint according to the present invention has an effect that multiple addresses and associated fingerprints simultaneously collected from arbitrary devices can be filtered to construct a highly reliable radio map on the basis of the filtered fingerprints and addresses.

In addition, the method and server for associating an address with a fingerprint according to the present invention has an effect that fraudulent transactions can be detected through recognition of the collection locations of fingerprints in product transaction or payment.

It is to be understood that the effects that are attainable by the present invention are not limited to the effects mentioned above and other effects not mentioned will be obvious to one of ordinary skill in the art from the description below.

BEST MODE

The above and other objectives, features, and advantages of the present invention will become more apparent from the following detailed description of the present invention when taken in conjunction with the accompanying drawings, and accordingly those skilled in the art to which the present invention belongs may easily implement the technical idea of the present invention. In addition, in the following description, well-known functions or constructions are not described in detail since they would obscure the invention in unnecessary detail. Hereinafter, preferred embodiments of the present invention will be described in detail with reference to the accompanying drawings.

Figure 1:
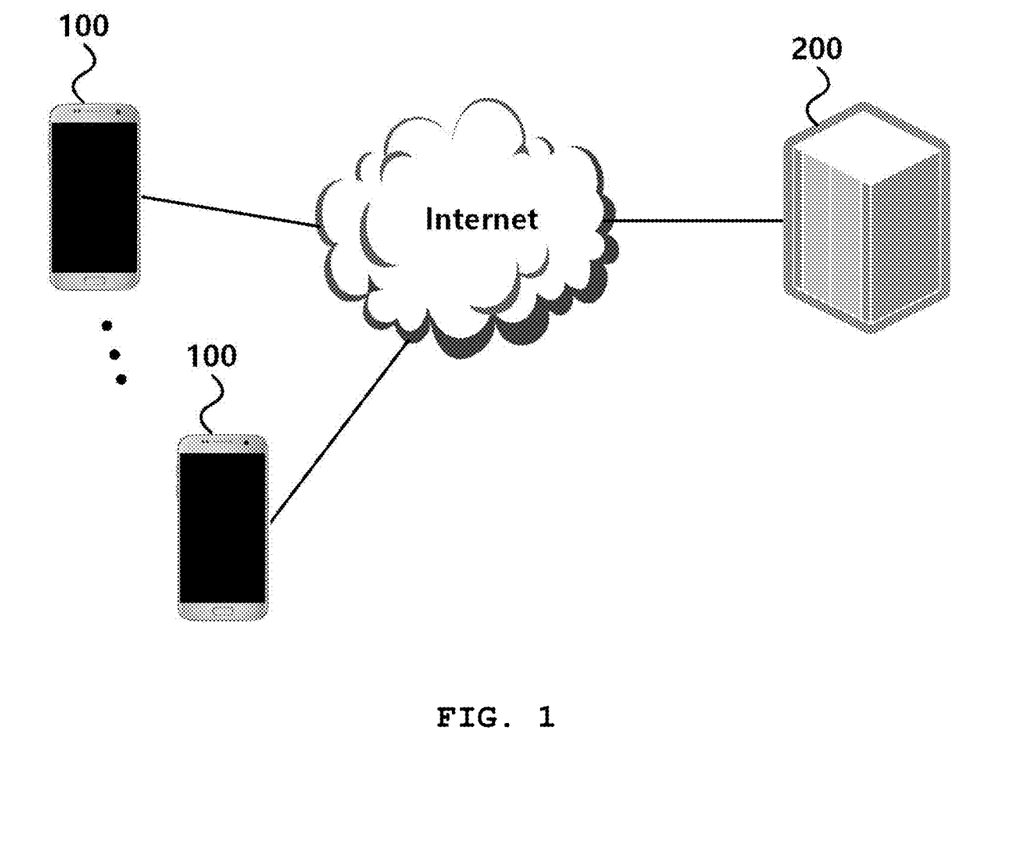
FIG. 1 is a diagram showing an example of a connection configuration between devices in an address-fingerprint association system.

FIG. 1 is a diagram showing an example of a connection configuration between devices in an address-fingerprint association system.

Referring to FIG. 1, the address-fingerprint association system includes one or more user terminals 100 and an address-fingerprint association server 200, in which the user terminal 100 and the address-fingerprint association server 200 are connected to each other through the Internet.

Considering briefly components of FIG. 1, the user terminal 100 is a terminal capable of being used by a general user. The user terminal 100 may be, for example, a smartphone, a notebook computer, a tablet PC, a personal computer, and the like.

The user terminal 100 may access various servers through the Internet, browse various web pages through the server, or make a request for services and receive the services. The user terminal 100 may be equipped with a nonvolatile memory, and the memory may include one or more apps that perform various processes by accessing the server. For example, the user terminal 100 is configured to include an online shopping app, a delivery app, etc., which enables to perform online shopping or to deliver ordered products.

The user terminal 100 drives the stored app to be connected to a designated server (e.g., an online shopping providing server), and may make a request for various service to the connected server. Apps that make a request for order and delivery of goods, such as an online shopping app or a delivery app, are preferably configured in such a manner as to be connected to the association server 200 when being driven. The association server 200 may be the same as or different from a server providing the designated service.

The user terminal 100 driving the app receives an address to which products are to be delivered as a user input through an input interface. Herein, the user input may include performing a part or all of processes of selecting an existing saved address or selecting an address recommended by the server, as well as performing a user's direct input. For example, the address may include information such as a room number.

Since the address for delivery is normally input accurately and carefully to ensure successful delivery, there is an advantage of high reliability, accuracy, and precision of the corresponding address information.

In addition, the user terminal 100 driving the app is configured to collect wireless LAN fingerprints when performing an address input. For example, the user terminal 100 activates a wireless LAN interface provided in the user terminal 100 for a predetermined period of time (for example, 1 minute, 30 seconds, 10 seconds, etc.) of time before, after, or before and after the address input is performed, and collects the wireless LAN fingerprints through the wireless LAN interface.

The wireless LAN fingerprints may be obtained from wireless LAN signals output from a wireless AP or the like. The wireless LAN fingerprint includes one or more wireless LAN identifier and wireless LAN signal strength pairs. Since the wireless LAN fingerprints are collected for a predetermined period of time, it is possible to collect one or more wireless LAN identifier and wireless LAN signal strength pairs, which are capable of being recognized by the user terminal 100. The wireless LAN identifier may be, for example, a service set identifier (SSID), a basic service set identifier (BSSID), or the like. The wireless LAN fingerprints may be collected through an API of an operating system provided from the user terminal 100.

As such, the user terminal 100 is provided with an app that requests an address input and is configured to collect wireless LAN fingerprints as well as addresses to provide the collected information including thee addresses and the wireless LAN fingerprint and transmit the collected information to the association server 200 when inputting an address through this app and when making a request for service through such an address input.

The association server 200 is connected to one or more user terminals 100 to associate (label) the wireless LAN fingerprint with the address using the information collected from the one or more user terminals 100. The association server 200 is configured to construct a radio map using the addresses and wireless LAN fingerprints collected from the user terminal 100.

The association server 200 will be described in detail referring to FIG. 2.

The Internet is an IP-based computer communication network that may connect various devices (terminals) to each other and transmits and receives various data on the basis of an IP address. Various servers are connected to the Internet.

Although FIG. 1 shows main components required for the address-fingerprint association system, other components may be further included in the association system. For example, the association system may further include servers capable of providing a location-based service using the constructed radio map. These servers may provide a road guidance service using the radio map to the user terminal 100 or provide various services based on the radio map to a user.

Figure 4:
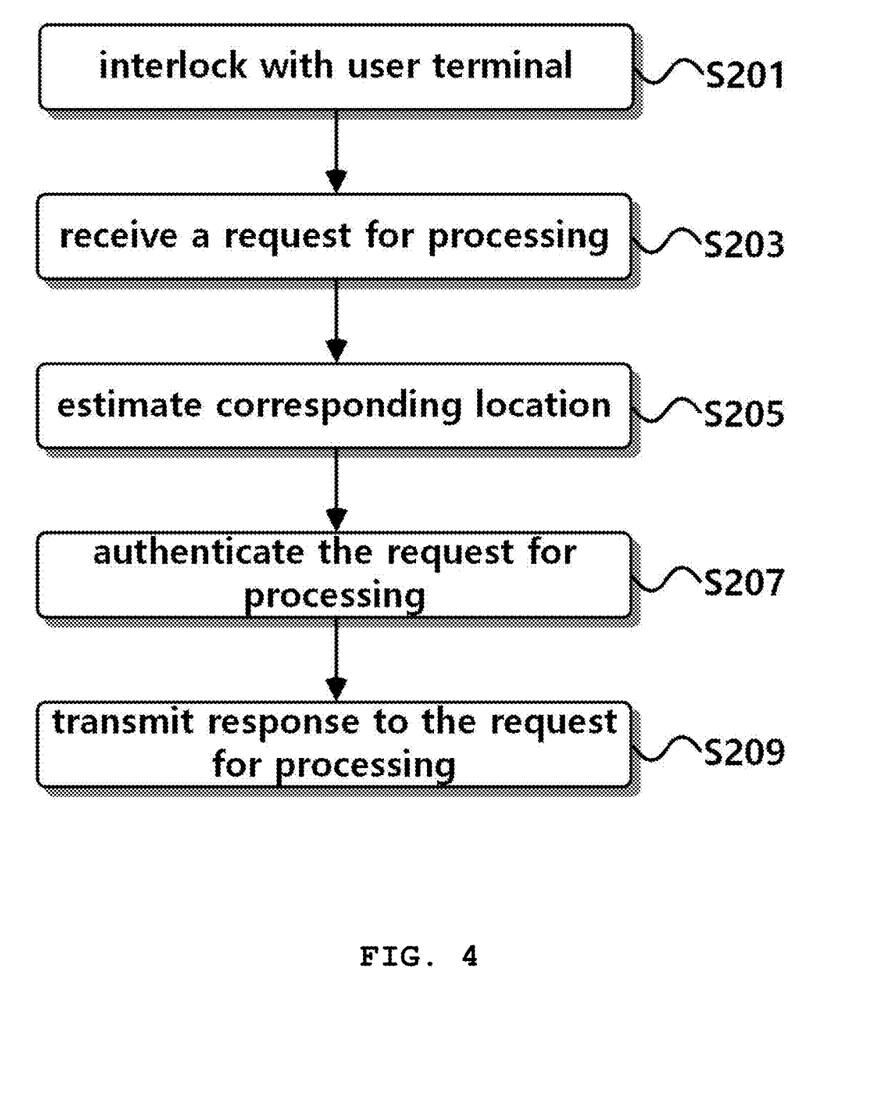
FIG. 4 is a diagram showing an exemplary control flow of an application using a constructed radio map.

Any server may detect a fraudulent transaction based on the recognized address (location). For example, a specific server may authenticate an address (location) where the transaction occurs on the basis of address (location) recognition in online transactions, online payments, or the like, thereby making it possible to perform safe product transaction or payment processing. The radio map constructed in accordance with the present invention is preferably used to detect fraudulent transactions. Referring to FIG. 4, an application example that utilizes fraudulent transactions will be described in more detail.

Figure 2:
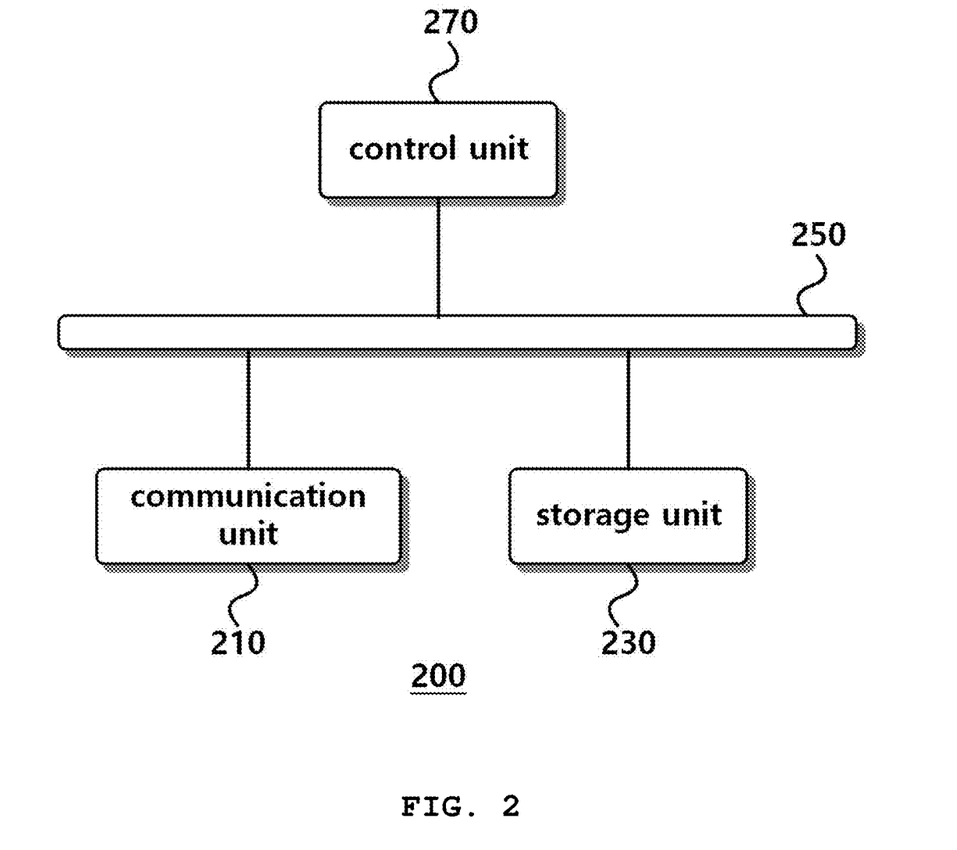
FIG. 2 is a diagram showing an exemplary block diagram of an address-fingerprint association server.

FIG. 2 is a diagram showing an exemplary block diagram of an address-fingerprint association server 200.

According to FIG. 2, the association server 200 includes a communication unit 210, a storage unit 230, a connection unit 250, and a control unit 270. FIG. 2 preferably shows a functional block diagram, and each functional block has a corresponding hardware block. The association server 200 in FIG. 2 may be configured using various hardwares. For example, the association server 200 may be configured using one or more PCs, workstations, and/or mainframes. Other blocks not shown in FIG. may be further included in the block diagram according to design variations.

The association server 200 in FIG. 2 may be configured as a separate server that operates independently, or may be embedded as a partial function in another server (online shopping, delivery, etc.).

Considering the association server 200 referring to FIG. 2, the communication unit 210 transmits and receives various data through the Internet. The communication unit 210 is connected to the Internet through a wired LAN interface or the like to receive communication packets representing various data or requests and to output response packets to the received communication packets over the Internet.

For example, the communication unit 210 receives collected information from the user terminal 100 through the Internet, in which the received collected information includes addresses and wireless LAN fingerprints. The address is an address determined by a user input of the user terminal 100, and the wireless LAN fingerprint includes one or more wireless LAN identifier and wireless LAN signal strength pairs collected when the address input is performed.

In addition, after constructing the radio map, the communication unit 210 may receive a request for processing, in addition to the wireless LAN fingerprint, directly from the user terminal 100 or from another server through the Internet, and transmit the same to the control unit 270.

The storage unit 230 stores various data and programs. The storage unit 230 is equipped with a large-capacity storage medium such as a hard disk to store various data and programs. The storage unit 230 may configure a database using one or more equipped hard disks.

Considering various data stored in the storage unit 230, the storage unit 230 stores the received collected information through the communication unit 210. The storage unit 230 stores a wireless LAN fingerprint and a collection time, and further a terminal ID and/or a user ID of the user terminal 100, which are the collected information while associating the information with the collected address. Multiple pieces of collected information (wireless LAN fingerprint, collection time, terminal ID and/or user ID of the user terminal 100) associated with each address may be stored.

In addition, the storage unit 230 stores a radio map constructed by using the collected information. The radio map may be constructed for a specific area, and may be configured using a wireless LAN fingerprint labeled in correspondence with a location (or an address corresponding to the location) in the form of a database. The wireless LAN fingerprint labeled with each location (address) is constructed using the collected information received from an unspecified user terminal 100.

In addition, the storage unit 230 stores various programs available in the control unit 270. For example, the storage unit 230 may store a control program for constructing the radio map from the collected information. This control program may implement an algorithm for calculating a connectivity index to construct the radio map.

The connection unit 250 transmits and receives data between blocks in the association server 200. The connection unit 250 is configured using a local area network, a parallel bus, a serial bus, and the like.

The control unit 270 has one or more execution units to load a program stored in the storage unit 230 and executes command codes of the program through the execution unit to control the association server 200.

Considering an example of control performed in the control unit 270, the control unit 270 receives the collected information from any user terminal 100 through the communication unit 210 and stores the same in the storage unit 230. For example, the control unit 270 creates collection items in a collection list corresponding to the address of the collected information, and stores a wireless LAN fingerprint, collection time, a terminal ID, and/or a user ID in such a manner as to include the same in the created collection item. Accordingly, the collection list for each address may include a plurality of collection items.

The control unit 270 filters multiple pieces of collected information stored for each address using collected information of an adjacent address, and constructs the radio map using the filtered collected information.

The control unit 270 calculates a connectivity index of the corresponding address to each piece of collected information by using the collected information (items) in the adjacent address and different collected information (items) in the same address with respect to the collected information (item) for each address, and filters the collected information according to the calculated connectivity index.

As an example for calculating the connectivity index, the control unit 270 compares wireless LAN fingerprints of collected information (item) for each address with wireless LAN fingerprints of collected information (items) of adjacent address, respectively, to increase the connectivity index of the wireless LAN fingerprint by a predetermined number (for example, one) when two wireless LAN fingerprints have a wireless LAN identifier in common, and to decrease the connectivity index by a predetermined number when two fingerprints have no wireless LAN identifier in common.

Accordingly, the higher the similarity between the wireless LAN fingerprint for which the connectivity index is currently calculated and other adjacent wireless LAN fingerprint, the higher the connectivity index. To the contrary, the lower the similarity, the lower the connectivity index.

Since the connectivity index may be calculated individually for each piece of collected information (item) mapped to a specific address, the degree of connection between the address and the wireless LAN fingerprint for each piece of collected information may be determined by using different wireless LAN fingerprints.

In addition, the control unit 270 compares the wireless LAN fingerprints of the collected information (item) for each address with the wireless LAN fingerprints of the other collected information (items) of the same address (collection list) to increase the connectivity index of the wireless LAN fingerprint by a predetermined number (for example, one) when the two fingerprints have a wireless LAN identifier in common and to decrease the connectivity index by a predetermined number when the two fingerprints have no wireless LAN identifier in common. Through this process, it is possible to calculate the connectivity index according to the similarity with wireless LAN fingerprints collected from the same address, as well as the similarity with wireless LAN fingerprints in the adjacent address.

The control unit 270 may calculate, for each wireless LAN fingerprint, a connectivity index, which is proportional to the number of wireless LAN identifiers in common with wireless LAN fingerprints in not only the same address but also the adjacent address.

The control unit 270 may calculate the connectivity index by further reflecting other factors. For example, the control unit 270 may calculate the connectivity index by assigning a weight to the collection time, or may calculate the connectivity index by changing the weight on the basis of a terminal ID or a user ID. For example, when the collection time is at night (for example, 10 pm to 6 am), a higher weight may be assigned. In addition, the control unit 270 may calculate the connectivity index by assigning different weights according to a gender, age, occupation, etc. of a user who transmits the collected information. The connectivity index based on weighting may be calculated according to various forms, methods, or algorithms.

The control unit 270 calculates the connectivity index in the collected information (item) for each address, and then filters the collected information to construct the radio map on the basis of the connectivity index.

For example, the control unit 270 labels the wireless LAN fingerprint having the highest connectivity index for each address (location) with the address (location) and stores the resulting as a radio map database. The radio map may be obtained by labeling a wireless LAN fingerprint with an address, or may be obtained by labeling a wireless LAN fingerprint with a location corresponding to the address. Herein, a specific area is divided into a plurality of location areas, and a location and wireless LAN fingerprint pair is stored by labeling to each location. The specific location may correspond to any address. The location here may be specified as a coordinate according to a coordinate system, and may be determined as a specific point, for example, a center point, in the area of the corresponding address.

The database entry of the radio map includes at least an address (location) and wireless LAN fingerprint pair, and the wireless LAN fingerprint labeled with the address of each entry is set as the wireless LAN fingerprint of the collected information having the highest connectivity index above a predetermined threshold. Accordingly, it is possible to filter various errors occurring according to a random collection of addresses and wireless LAN fingerprints, thereby constructing a reliable radio map.

Thereafter, the control unit 270 receives a request for processing through the communication unit 210, estimates the corresponding location of the wireless LAN fingerprint for which the request for processing is performed using the constructed radio map, and authenticates the request for processing on the basis of the estimated location. The authenticated result may be transmitted to the user terminal 100 or another server, and fraudulent transactions may be detected on the basis of the estimated location (address).

Various controls performed on the association server 200 will be described in more detail through FIGS. 3 and 4.

Figure 3:
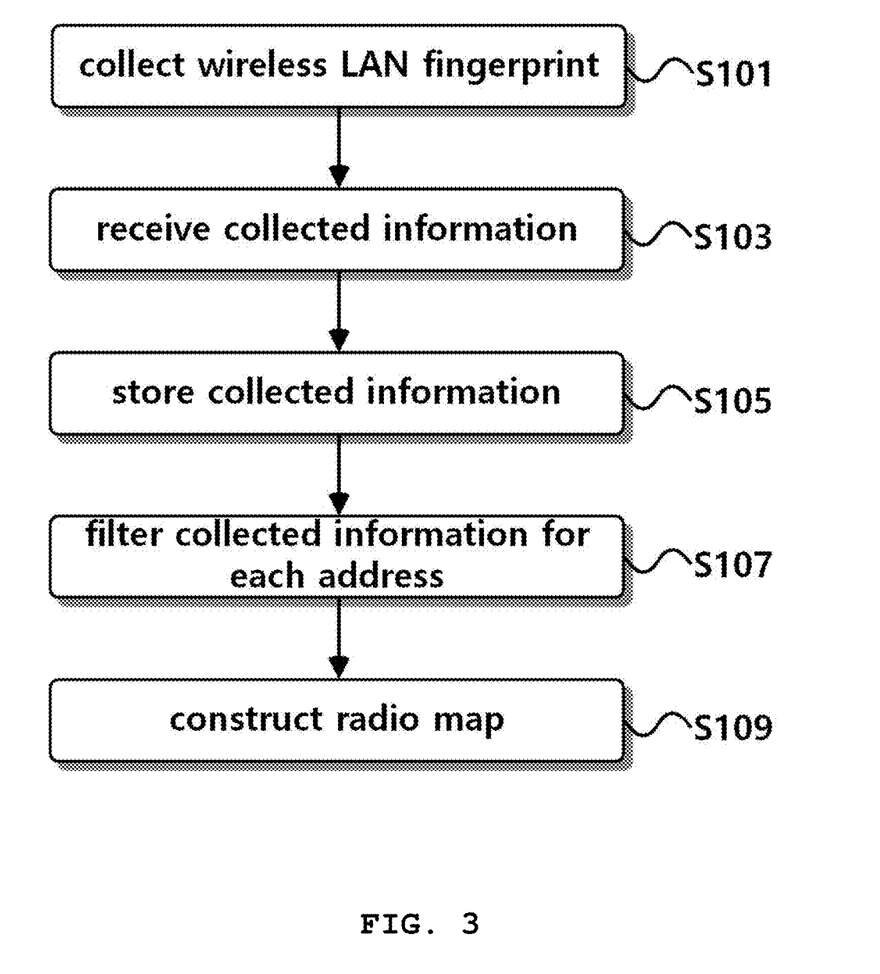
FIG. 3 is a diagram showing an exemplary control flow for constructing a radio map according to association of wireless LAN fingerprints and addresses that are collected.

FIG. 3 is a diagram showing an exemplary control flow for constructing a radio map according to association of wireless LAN fingerprints and addresses collected. The control flow in FIG. 3 may be performed by allowing the association server 200, preferably the control unit 270 to control another blocks.

First, any user terminal 100 collects wireless LAN fingerprints (S101).

For example, the user terminal 100 drives an online shopping app, a shipping app, an item ordering app, and the like, and inputs an address, to which goods are to be delivered through the app, by using an input interface. The app of the user terminal 100 drives the wireless LAN fingerprint scan module (program module) provided when performing the address input to configure one or more wireless LAN identifier (e.g., BSSID) and wireless LAN signal strength pairs. For example, the user terminal 100 scans wireless LAN signals for a predetermined period of time before, after, or before and after the address input is completed and configures a fingerprint including the identifier and signal strength pair.

The user terminal 100 configures collected information and transmits the same to the association server 200 through the Internet, and the association server 200 receives the same (S103). The collected information includes an address determined by an input from the user terminal 100 and one or more wireless LAN identifier and wireless LAN signal strength pairs collected when the address is input, and is received through the Internet from an app that requires an address input, such as an online shopping app, a delivery app, or an item ordering app installed in the user terminal 100. Such an app collects wireless LAN identifier and signal strength pairs for a predetermined period of time (e.g., 30 seconds, 1 minute, etc.) before, after, or before and after the address input is received.

The control unit 270 of the association server 200 receives the collected information through the communication unit 210 and stores the same in the storage unit 230 (S105). For example, the control unit 270 of the association server 200 searches the storage unit 230 for a collection list corresponding to the address of the collected information to create a new collection item and store the same in the found collection list. The new collection item includes a wireless LAN fingerprint of the collected information and further includes a collection time, a terminal ID, and/or a user ID. The collection time, terminal ID, or user ID may also be included in the collected information.

Through this configuration, the control unit 270 of the association server 200 constructs and stores a collection list for each address in an area where each radio map is to be constructed. Each collection list preferably includes multiple collection items, and each collection item may contain wireless LAN fingerprints collected by a single user or by multiple users.

When a collection list for each address is constructed and the number of collection lists is greater than or equal to a predetermined number or the collection period has elapsed, the control unit 270 of the association server 200 filters multiple pieces of collected information stored for each address on the basis of multiple pieces of collected information in an address adjacent to the address (S107).

According to the similarity between a wireless LAN fingerprint in an address in which the filtering is currently performed and a wireless LAN fingerprints in an adjacent address to the address, the control unit 270 of the association server 200 may filter any wireless LAN fingerprint in the address.

For example, the control unit 270 of the association server 200 calculates a connectivity index (for example, a score) between each of multiple pieces of collected information for each address and the address by using each wireless LAN fingerprint of collected information in adjacent addresses, and filters any collected information on the basis of the calculated connectivity index.

In addition, the control unit 270 of the association server 200 may calculate a connectivity index between wireless LAN fingerprints of multiple pieces of collected information for each address and the corresponding addresses by further using wireless LAN fingerprints of different collected information in the same address, and filter any collected information on the basis of the calculated connectivity index.

More specifically, the control unit 270 of the association server 200 determines a collection list in an address adjacent to each address. The adjacent address may vary according to the address system and may be determined according to the similarity of the address texts or the address structure.

The control unit 270 of the association server 200 calculates a connectivity index for each of collection items in a collection list collected for each of all addresses.

In order to calculate the connectivity index for each collection item of the collection list for each address, the control unit 270 of the association server 200 compares the wireless LAN fingerprint of the collection item with a wireless LAN fingerprint of each collection item in each collection list of the adjacent address, and increase the connectivity index by a predetermined score (for example, one) when the wireless LAN fingerprints to be compared are similar to each other and decrease the connectivity index by a predetermined score (for example, one) when the wireless LAN fingerprints to be compared are not similar to each other.

For example, the control unit 270 of the association server 200 increases the connectivity index by one when two wireless LAN fingerprints have a wireless LAN identifier in common, and decreases the connectivity index by one when two wireless LAN fingerprints have no wireless LAN identifier in common. Through comparison with the wireless LAN fingerprint in the adjacent address, the reliability (connectivity) between the current verified collection item and the corresponding address is recognized using the surrounding wireless LAN fingerprints, thereby calculating the connectivity index.

In addition, the control unit 270 of the association server 200 compares the wireless LAN fingerprint of the collection item with a wireless LAN fingerprint of a different collection item in the collection list of the same address, and increase the connectivity index by a specified score (for example, one) when two wireless LAN fingerprints to be compared are similar and decrease the connectivity index by a specified score (for example, one) when two wireless LAN fingerprints to be compared are not similar.

For example, the control unit 270 of the association server 200 may increase the connectivity index by one when two wireless LAN fingerprints have a wireless LAN identifier in common, and decrease the connectivity index by one when two wireless LAN fingerprints have no wireless LAN identifier in common. Through comparison with the wireless LAN fingerprints in the same address, the reliability (connectivity) between the currently verified collection item and the corresponding address is recognized using wireless LAN fingerprints collected from the same address, thereby calculating the connectivity index.

In calculating the connectivity index, the control unit 270 of the association server 200 may further use collection time information included in the collected information for each address. For example, the control unit 270 of the association server 200 may increase or decrease the connectivity index by giving variable weights according to the collection time.

Figure 5:
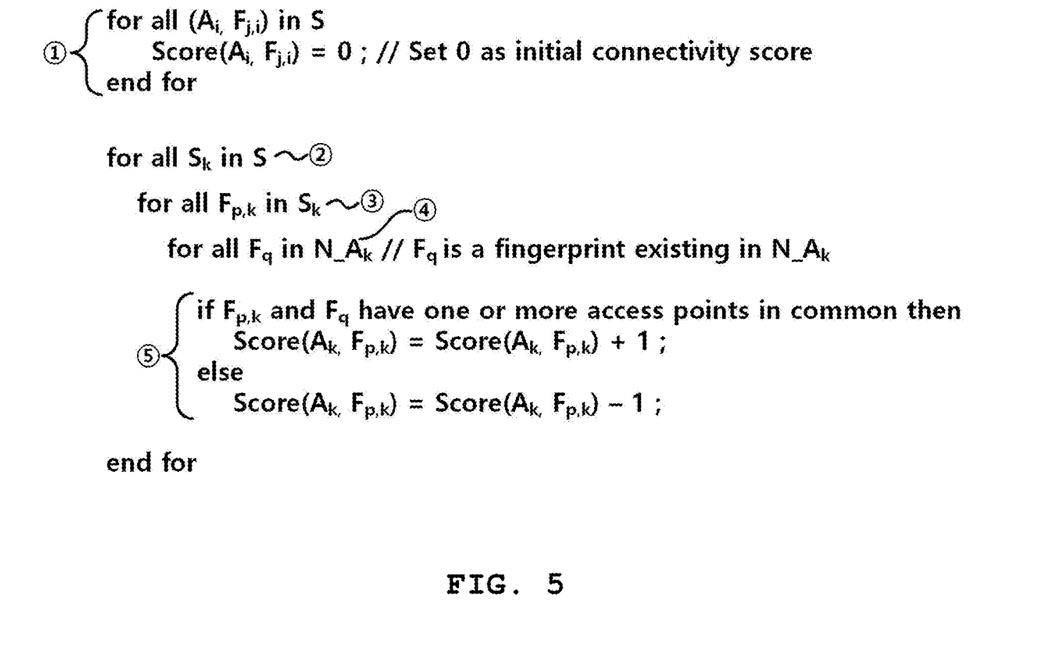
FIG. 5 is a diagram showing a simplified exemplary algorithm for calculating the connectivity index.

FIG. 5 is a diagram showing a simplified exemplary algorithm for calculating the connectivity index, in which the algorithm is implemented as a program and stored in the storage unit 230, and the control unit 270 performs the same to calculate the connectivity index for each collection item.

Referring to FIG. 5, an entire set of <address, fingerprint> pairs collected in the storage unit 230 is S={<A$_1$, F$_{1,1}$>, <A$_1$, F$_{2,1}$>, . . . , <A$_1$, F$_{m1,1}$>, <A$_2$, F$_{1,2}$>, . . . , <A$_2$, F$_{m2,2}$>, . . . , <A$_n$, F$_{1,n}$>, . . . , <A$_n$, F$_{mn,n}$>}, and a set of <address, fingerprint> pairs collected from an address A$_k$ is S$_k$={<A$_k$, F$_{1,k}$>, <A$_k$, F$_{2,k}$>, . . . , <A$_k$, F$_{mk,k}$>} (where, S$_k$ corresponds to a collection list and each <address, fingerprint> pair corresponds to a collection item). When a set of fingerprints collected from addresses around the address A$_k$ is termed N_A$_k$, the algorithm of FIG. 5 calculates and outputs the connectivity index score (A$_i$, F$_{j,i}$) of the <address, fingerprint> pairs.

First, the algorithm initializes the connectivity index of all <address, fingerprint> pairs in the set (refer to ①).

Thereafter, with respect to each set S$_k$ in the set S (refer to ②), the connectivity index is calculated for all fingerprints F$_{p,k}$ in the set (see ③).

Then, through comparison between each fingerprint F$_q$ of the address N_A$_k$ adjacent to the address A$_k$ (see ④) and the fingerprint F$_{p,k}$ for which the connectivity index is currently calculated, the connectivity index is calculated (refer to ⑤). For example, when two fingerprints have any wireless LAN identifier (AP) in common, the connectivity index score(A$_k$, F$_{p,k}$) is increased by one, and when two fingerprints have no wireless AP in common, the connectivity index is decreased by one.

Although the connectivity index is calculated through simple comparison with the fingerprint set in adjacent addresses in ⑤ of the algorithm, it is not necessarily limited thereto, but various additions and modifications are possible. For example, another fingerprint within the same address A$_k$ is further compared with the current fingerprint F$_{p,k}$, and the connectivity index may be increased or decreased by one according to the presence or absence of any wireless AP in common.

In addition, the algorithm may assign a weight to the addition or subtraction of the connectivity index. For example, when the current fingerprint F$_{p,k}$ is collected during the night time (from 10 pm to 6 am), a higher weight (e.g. a number greater than 1, etc.) may be assigned. In addition, the algorithm may assign different weights according to an age, gender, occupation, etc. of a user who has collected the fingerprint F$_{p,k}$.

As the algorithm is completely performed, the connectivity index for the corresponding address of all collected wireless LAN fingerprints is calculated. As the connectivity index is calculated, it is possible to provide the reliability quantified between each wireless LAN fingerprint and the corresponding address. The connectivity index is preferably calculated using wireless LAN fingerprints collected from an adjacent address and different wireless LAN fingerprints collected from the same address.

Again, considering the control flow through FIG. 4, as the connectivity index is calculated, the control unit 270 of the association server 200 filters the collected information for each address according to the value of the connectivity index, and then construct a radio map using the collected information filtered for each address (S109).

For example, the control unit 270 of the association server 200 labels an address to a fingerprint, having a connectivity index greater than or equal to a predetermined threshold value, among fingerprints for each address, and stores the resulting in a database. Preferably, the control unit 270 of the association server 200 labels an address to a fingerprint having a connectivity index that is equal to or greater than a predetermined threshold and is greatest, among fingerprints for each address, and stores the same in a database. The entries in the database contain wireless LAN fingerprints that are labeled with addresses (or locations corresponding to addresses), and the wireless LAN fingerprints have high confidence of being collected through a specific app from the corresponding address.

FIG. 4 is a diagram showing an exemplary control flow of an application using a constructed radio map. The control flow of FIG. 4 may be performed in the association server 200 or may be performed in an online server (e.g., an online shopping mall server) provided with the radio map.

First, the user terminal 100 is interlocked with a server through a provided app (S201). For example, the user terminal 100 may log in or access the server to display or output information on various products or services.

The user terminal 100 configures a request for processing through an input interface and the like, and the server receives the request for processing (S203). The corresponding app of the user terminal 100 is configured to collect at least a wireless LAN fingerprint, and the wireless LAN fingerprint is included in the request for processing. The request for processing may be a request for a specific transaction from the server. For example, the request for processing may be a request to purchase a specific product or service.

The server estimates a location corresponding to the wireless LAN fingerprint included in the request for processing using the constructed radio map (S205). For example, the server may estimate a specific location in which the request for processing is performed according to the similarity between the fingerprint of each entry of the radio map and the received wireless LAN fingerprint.

The server authenticates the request for processing received according to the estimated location (S207). For example, the server compares an estimated location and a request time of each of past requests for processing of the user terminal 100 with an estimated location and a request time of a current request for processing, respectively. When two estimated locations to be compared are separated from each other by a predetermined distance (e.g., 100 km) or more and the request time is within a predetermined period of time (e.g., 10 minutes), the server may determine that the possibility of fraudulent transactions is high. Otherwise, the server may determine that a proper request for processing is performed in the estimated location.

The server generates a response to the authentication of the request for processing and transmit the same to the user terminal 100 (S209), and process the request for processing through an internal process.

It will be apparent to those skilled in the art that various modifications and variations can be made in the present invention without departing from the spirit or scope of the invention, so that the present invention is not limited to the foregoing embodiments and the accompanying drawings.

The invention claimed is:

1. A method of associating an address with a fingerprint, the method comprising:
   receiving collected information including an address input from a user for delivery of goods and a wireless LAN fingerprint collected when the address is input;
   storing the address and the wireless LAN fingerprint of the received collected information while associating the address and the fingerprint with each other;
   filtering multiple pieces of stored collected information; and
   constructing a radio map by using the filtered collected information,
   wherein the radio map is a database including an address or location and wireless LAN fingerprint pair for each entry, and
   the filtering is performed on the basis of a similarity obtained by comparing wireless LAN fingerprints in which the associated addresses are adjacent to each other.

2. The method of claim 1, wherein the wireless LAN fingerprint of the received collected information includes one or more wireless LAN identifier and wireless LAN signal strength pairs.

3. The method of claim 2, wherein the received collected information is received from an online shopping app or a delivery app installed in the user terminal; and
   the online shopping app or the delivery app collects the one or more wireless LAN identifier and wireless LAN signal strength pairs for a predetermined period of time before, after, or before and after the address input is received from the user.

4. The method of claim 1, wherein the filtering comprises: calculating a connectivity index between the address and the wireless LAN fingerprint associated with each other, and performing filtering according to the connectivity index,
   wherein the higher the similarity, the higher the connectivity index, and the lower the similarity, the lower the connectivity index.

5. The method of claim 1, wherein the filtering comprises: calculating a connectivity index between the address and the wireless LAN fingerprint associated with each other, and performing filtering according to the connectivity index,
   wherein the connectivity index is increased when the wireless LAN fingerprints, in which the associated addresses are adjacent to each other, have a common wireless LAN identifier, and the connectivity index is decreased when the wireless LAN fingerprints, in which the associated addresses are adjacent to each other, have no common wireless LAN identifier.

6. The method of claim 4, wherein the constructing of the radio map comprises: labeling a wireless LAN fingerprint having the highest connectivity index for each address with the address or a location associated with the address, and storing a labeling result as the radio map.

7. The method of claim 1, further comprising: after the constructing of the radio map,
   receiving a request for processing including the wireless LAN fingerprint;
   estimating a location associated with the wireless LAN fingerprint using the radio map; and
   authenticating the request for processing according to the estimated location.

8. The method of claim 4, wherein the filtering comprises: calculating the connectivity index by further using collection time information included in the collected information.

9. A server for associating an address with a fingerprint, the server comprising:
   a communication unit receiving collected information including an address input from a user for delivery of goods and a wireless LAN fingerprint collected when the address is input;
   a storage unit storing the address and the wireless LAN fingerprint of the received collected information while associating the address and the fingerprint with each other; and
   a control unit filtering multiple pieces of the stored collected information and constructing a radio map by using the filtered collected information,
   wherein the radio map is a database including an address or location and wireless LAN fingerprint pair for each entry, and
   the filtering is performed on the basis of a similarity obtained by comparing wireless LAN fingerprints in which the associated addresses are adjacent to each other.

10. The server of claim 9, wherein the wireless LAN fingerprint of the received collected information includes one or more wireless LAN identifier and wireless LAN signal strength pairs.

11. The server of claim 10, wherein the control unit calculates a connectivity index between the address and the wireless LAN fingerprint associated with each other, and performs filtering according to the connectivity index,
   wherein the higher the similarity, the higher the connectivity index, and the lower the similarity, the lower the connectivity index.

12. The server of claim 11, wherein the control unit labels a wireless LAN fingerprint having the highest connectivity index for each address with the address or a location associated with the address, and stores a labeling result as the radio map.

13. The server of claim 10, wherein the control unit calculates a connectivity index between the address and the wireless LAN fingerprint associated with each other and performs filtering according to the connectivity index,
   wherein the connectivity index is increased when wireless LAN fingerprints, in which the associated addresses are adjacent to each other, have a common wireless LAN identifier, and the connectivity index is decreased when wireless LAN fingerprints, in which the associated addresses are adjacent to each other, have no common wireless LAN identifier.

14. The server of claim 10, wherein the control unit, after the constructing of the radio map, receives a request for processing including the wireless LAN fingerprint, estimates a location associated with the wireless LAN fingerprint using the constructed radio map, and authenticates the request for processing according to the estimated location.

15. The method of claim 5, wherein the constructing of the radio map comprises: labeling a wireless LAN fingerprint having the highest connectivity index for each address with the address or a location associated with the address, and storing a labeling result as the radio map.

16. The method of claim 5, wherein the filtering comprises:
   calculating the connectivity index by further using collection time information included in the collected information.

* * * * *